UNITED STATES PATENT OFFICE.

GEORGE HENRY LEONARD, OF LANDISBURG, PENNSYLVANIA.

TANNING COMPOSITION.

SPECIFICATION forming part of Letters Patent No. 326,753, dated September 22, 1885.

Application filed April 8, 1885. (No specimens.)

*To all whom it may concern:*

Be it known that I, GEORGE H. LEONARD, a citizen of the United States, residing at Landisburg, in the county of Perry and State of Pennsylvania, have invented a new and useful Composition of Matter to be Used for Tanning Hides, of which the following is a specification.

My composition consists of the following ingredients, combined in the proportions stated, viz: pure water, two thousand eight hundred gallons; *Comptonia asplenifolia*, two thousand pounds; *Cuphea viscosissima*, two hundred pounds; catechu, ten pounds.

My mode of preparation is as follows: First, I boil or steam all the above ingredients, excepting the catechu, in a copper tank or pool. I then, after having drawn off the first liquor, reboil the ingredients. I then discard all but the liquor, to which I add new material, as at first, thus increasing the strength of the liquor, which may be either new or partly spent, and in ten days after the hides have been in the liquor I dissolve the catechu in warm water or weak liquor and mix the same with the liquor in which the hides are tanning.

I am aware that *Comptonia asplenifolia* has been heretofore used in tanning. I am also aware that catechu has been used in a tanning composition, the other ingredients being different from those employed by me.

What I claim, and desire to secure by Letters Patent of the United States, is—

1. The hereinbefore-described composition for tanning, consisting, essentially, of about ten parts *Comptonia asplenifolia*, one part *Cuphea viscosissima*, and a sufficient quantity of water, combined for use substantially as described.

2. The tanning compound described, consisting of water, *Comptonia asplenifolia*, and *Cuphea viscosissima*, in about the proportions specified, with the addition of catechu, substantially as hereinbefore set forth.

In testimony whereof I affix my signature in presence of two witnesses.

GEORGE HENRY LEONARD.

Witnesses:
LOUIS POTTER,
WM. A. LIGHTNER.